Aug. 4, 1970 G. CZUMAK ET AL 3,522,538

AUTOMATIC STATION IDENTIFIER

Filed Oct. 27, 1967 4 Sheets-Sheet 1

INVENTORS
LOUIS FREDERICK SCHUSTER, JR.
GEORGE CZUMAK

BY Brown, Schuyler & Beveridge

ATTORNEYS

Aug. 4, 1970 G. CZUMAK ET AL 3,522,538

AUTOMATIC STATION IDENTIFIER

Filed Oct. 27, 1967 4 Sheets-Sheet 2

INVENTORS
LOUIS FREDERICK SCHUSTER, JR.
GEORGE CZUMAK

BY Browne, Schuyler & Beveridge
ATTORNEYS

INVENTORS
LOUIS FREDERICK SCHUSTER, JR.
GEORGE CZUMAK
BY Browne, Schuyler & Beveridge
ATTORNEYS

INVENTORS
LOUIS FREDERICK SCHUSTER, JR.
GEORGE CZUMAK

BY Brown, Schuyler & Beveridge

ATTORNEYS 3,522,538

AUTOMATIC STATION IDENTIFIER

George Czumak, New Carrollton, and Louis Frederick Schuster, Jr., Adelphi, Md., assignors to Divelpro, Inc., Beltsville, Md., a corporation of Maryland Filed Oct. 27, 1967, Ser. No. 678,716
Int. Cl. H04b *1/04*
U.S. Cl. 325—166 19 Claims

ABSTRACT OF THE DISCLOSURE

Apparatus and method for automatic transmission of station call letters of a radio station utilizing a tape having voice record of station call letters and a fixed frequency control signal. A trigger signal actuated mechanism is utilized to initiate transmission and a transducer translates the recorded signals into electrical signals corresponding thereto, the control signal maintaining transmission before, during and after transmission of station call letters. The station call letters may be transmitted automatically at periodic intervals at the close of a message or period of activity by the operator at the radio station.

This invention relates to apparatus for automatic transmission of base station call letters as required by the regulations of the Federal Communications Commission.

It is an object of this invention to provide improved apparatus for voice transmission of station call letters automatically and which may be utilized with existing radio transmitters without substantial modification thereof.

In a preferred embodiment of the invention station call letters are recorded on one track of a multi-track magnetic tape and a fixed frequency control signal is recorded on another track of the tape. The tape is driven by a capstan which is selectively clutched through a clutch mechanism to a continuously operating constant speed motor. A programmer which may be selectively set for 15 or 30 minutes intervals, for example, supplies a trigger signal to a one shot multivibrator which produces a momentary start signal. This momentary start signal is utilized to control the clutch mechanism via a clutch relay to clutch the tape drive capstan to the tape drive motor to begin driving the tape. As soon as the tape is moving. one coil in a tape pick-up head transduces the fixed frequency control signal which is then amplified and applied to a clutch control relay to maintain the clutch energized. The clutch is thus held in or maintained by the fixed frequency control signal. Upon termination of the fixed frequency control signal on the tape, the clutch disengages the tape drive capstan from the tape drive motor. As the tape moves past the transducer, a second pick-up coil in the transducer detects the recording of the station's call letters and applies same to an amplifier which then applies these station call letters to the transmitter for transmission. The invention also includes a circuit for delaying transmission of station call letters until the end of a normal message transmission. Instead of periodically initiating transmission of the station call letters, a sensor coupled to the transmitter may supply a trigger pulse to the momentary time circuit to energize the clutch relay to begin driving the tape to produce the fixed frequency control signal and hence maintain the drive and in this respect the invention includes means for controlling a programmer so that a station's call letters are automatically transmitted after a period of activity. In addition, a manual start switch may be provided which initiates the transmission.

The foregoing and other objects, advantages and features of the invention will appear from the detailed description taken in connection with the accompanying drawings, and which will be described and set forth embodiments of the invention; it is to be understood, however, that the invention is not to be limited to the embodiments described and shown except as included within the appended claims.

In the accompanying drawings

Figure 1:
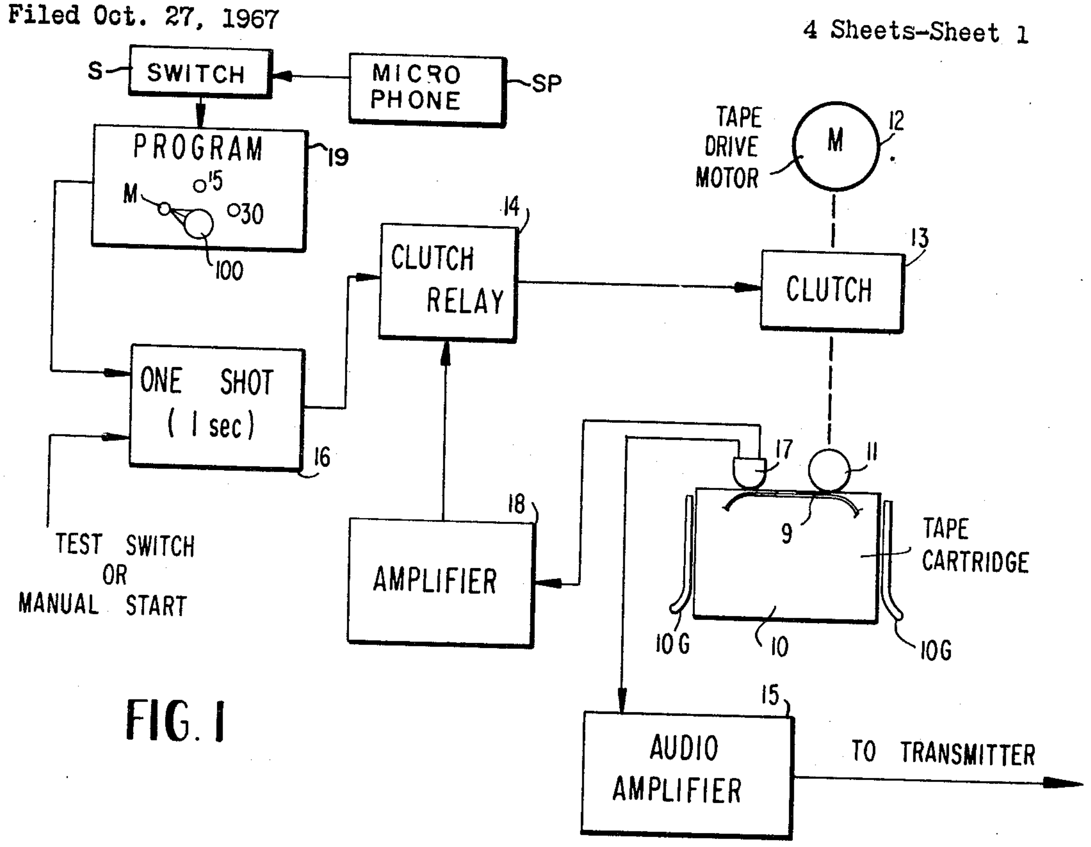

FIG. 1 is a pictorial block diagram illustrating a preferred embodiment of the invention.

Figure 4:
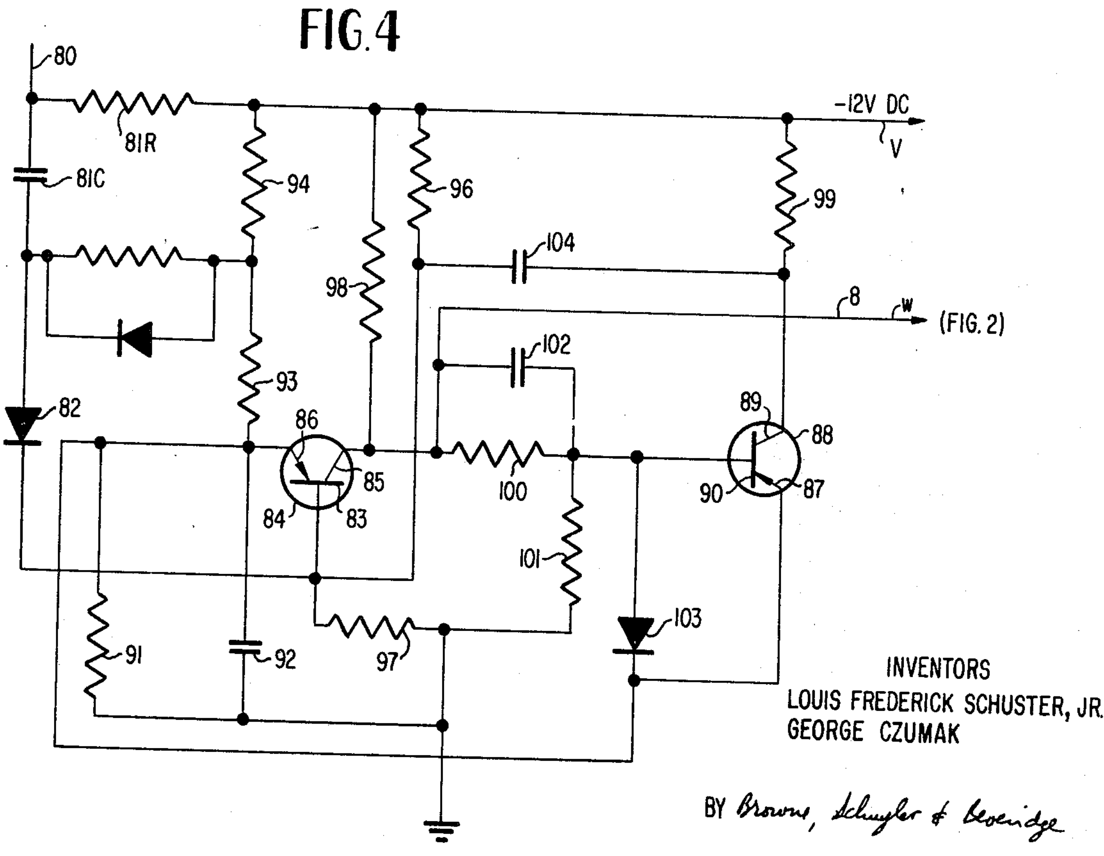
Figure 2:
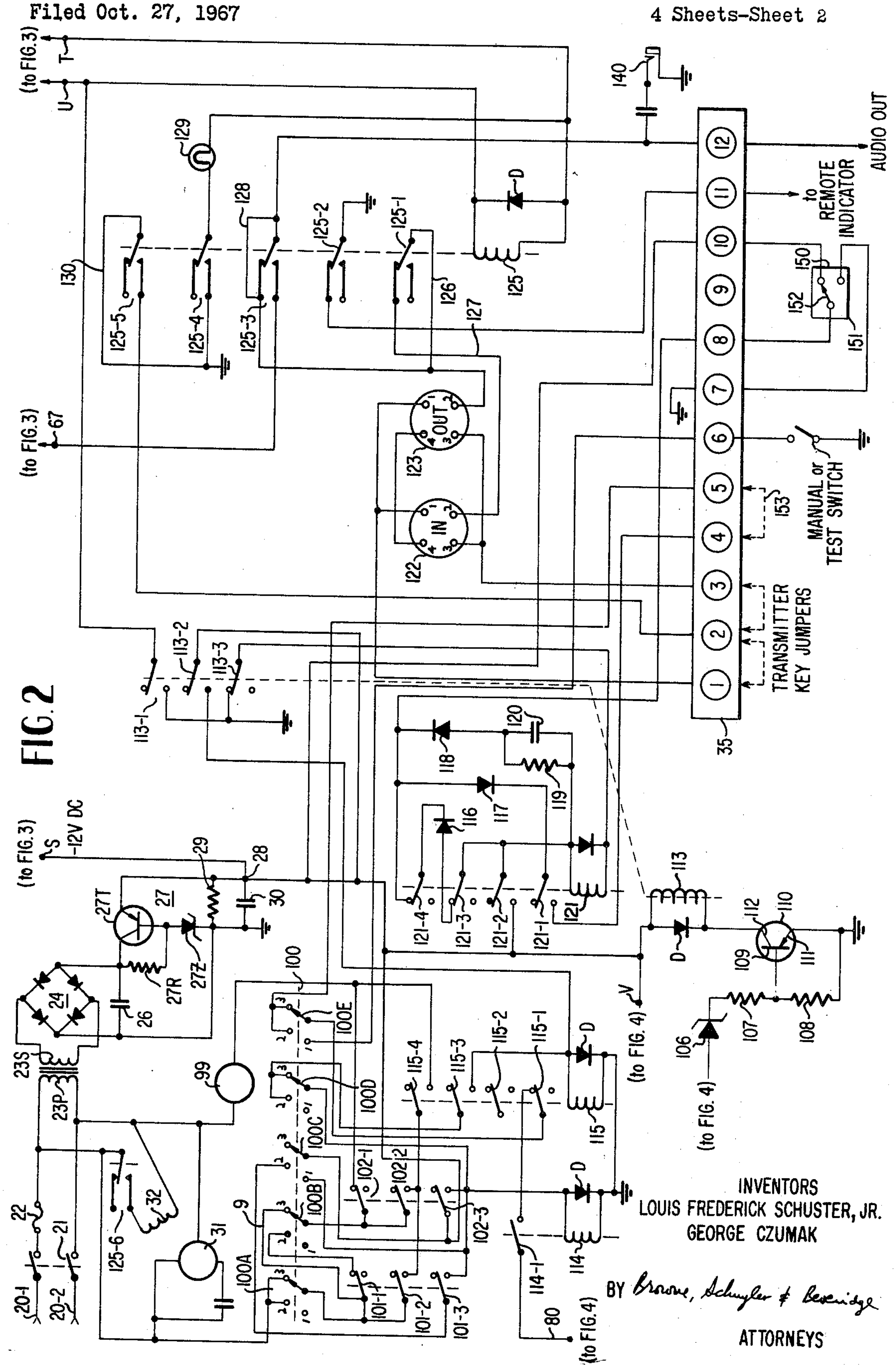
Figure 3:
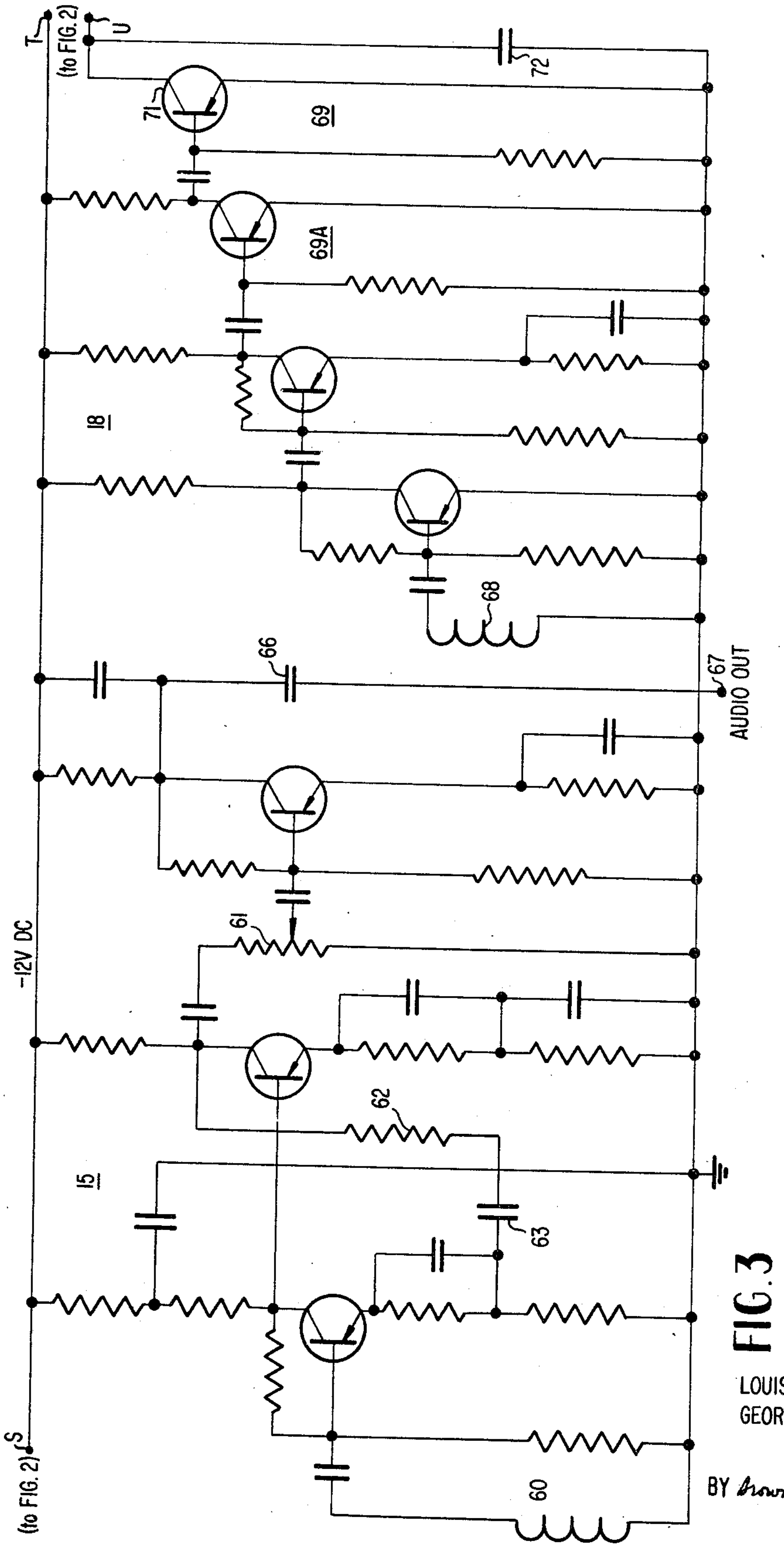
Figure 5:
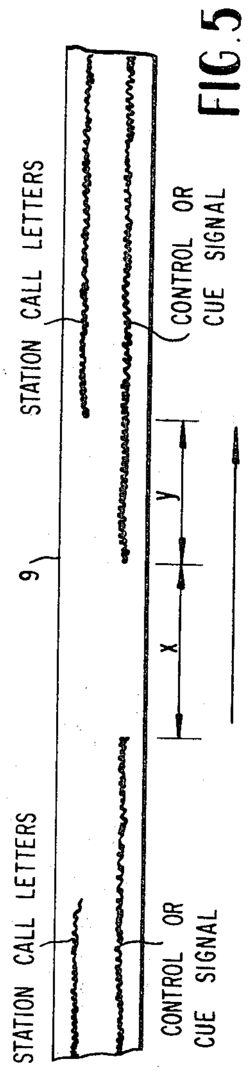
Figure 6:
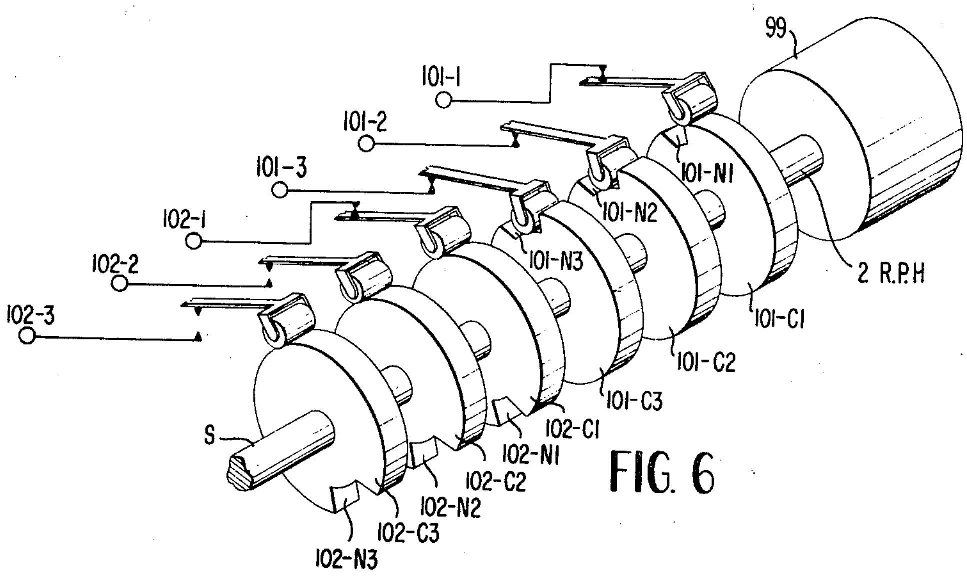
Figure 6A:
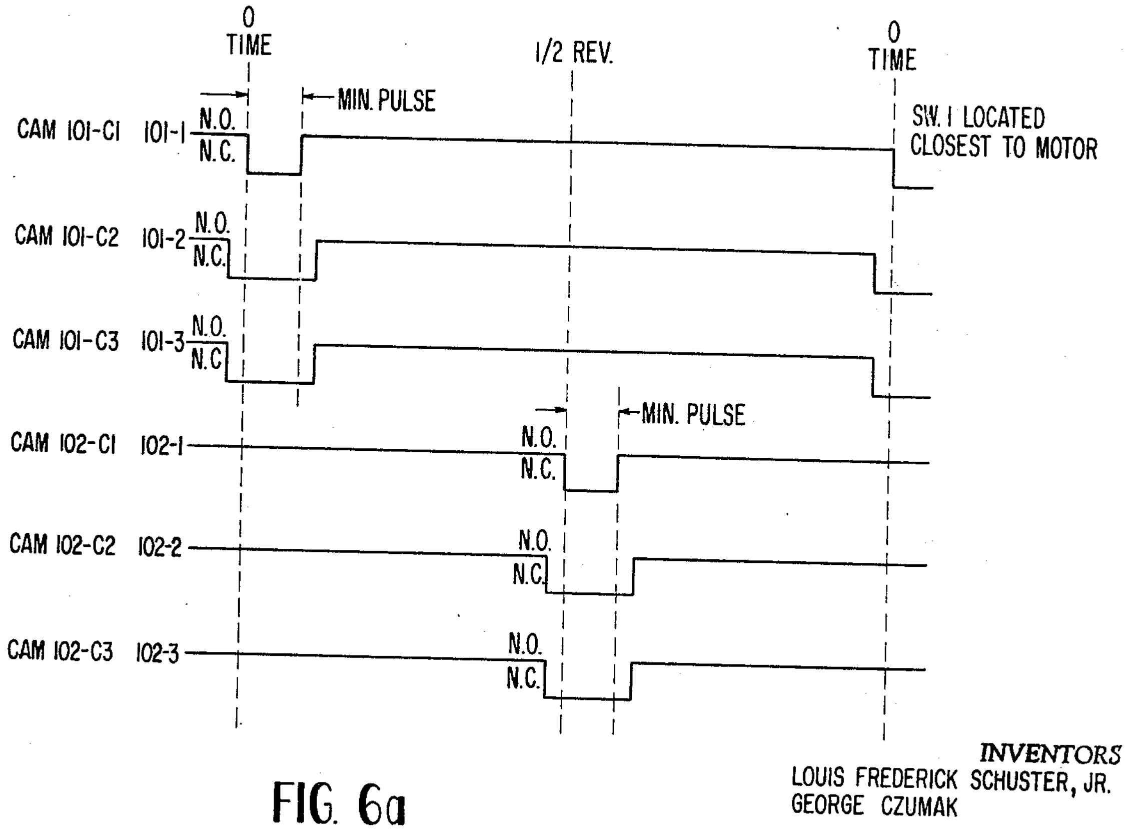

FIGS. 2, 3 and 4, taken collectively, illustrate in detail electrical circuitry for carrying out the invention, FIG. 5 is a section of tape illustrating the method of recording voice renditions of station call letters and control or use signals, and FIG. 6 is an isometric view of the programmer motor and cam-switch assembly and FIG. *6a* illustrates the waveforms of the cam-switch assembly.

GENERAL DESCRIPTION OF BLOCK DIAGRAM (FIG. 1)

The device utilizes a prerecorded tape cartridge 10 as a record medium. Preferably, the tape is a magnetic tape 9 of the endless mobius type contained within cartridge 10 and the cartridge is adapted to present tape 9 to a tape drive capstan 11 by cartridge guides 10G in such a way that the tape drive capstan is rotated or driven and the tape will be driven thereby. Normally, it takes about six to seven seconds to transmit a station's call letters, and when these are transmitted at periodic intervals in compliance with FCC regulations, these are transmitted at intervals of fifteen (15) minutes or thirty (30) minutes, as desired by the station. In order to conserve on tape and maintain fidelity, the tape is an endless mobius tape and the tape drive capstan is intermittently driven through clutching of the tape driven capstan to the tape drive motor 12. Clutch 13 couples continuously driven or operating tape drive motor 12 to tape drive capstan 11.

Clutch 13 is controlled by clutch relay circuit 14. Control of clutch relay circuit 14 is obtained from two sources: a momentary control or start signal is obtained from a time circuit such as one shot multivibrator circuit 16 which energizes the clutch relay circuit 14 and a set of contacts in clutch relay circuit 14 energizes the tape clutch 13 which couples tape drive motor 12 to tape drive capstan 11 to initiate movement of the tape in cartridge 10.

The tape, in addition to having voice record renditions of station call letters, also has recorded thereon a fixed frequency cue tone or control signal. Preferably, the tape 9 in tape cartridge 10 is a multitrack and the station call letters are recorded on one track and the cue tone or fixed frequency control signal is recorded on another track. Further, in order to assure that the station call letters are transmitted in their entirety and without distortion, the fixed frequency control signal is recorded on the tape over a longer portion thereof from slightly before where any station call letters are recorded, throughout the extent of recording of station call letters, to a point slightly after termination of the recorded station call letters (see FIG. 5). A pick-up head or transducer 17 has as one pick-up coil element oriented with respect to the track containing the fixed frequency recording and another pick-up element oriented with respect to the track carrying the station call letter recordings.

The output of the track oriented with the fixed frequency control signal is applied to an amplifier 18 and the output of amplifier 18 is applied as a hold-in signal to clutch relay circuit 14. In this way, time circuit 16 produces a start signal of about one second duration to cause clutch 13 to couple drive motor 12 to capstan 11 to begin movement of the tape. Movement of the tape past transducer element 17 produces the control signal which is amplified and applied to clutch relay circuit 14 to hold this circuit energized as long as there are fixed frequency control signals transduced by transducer 17.

Time circuit 16 receives a trigger pulse from a programmer 19 at periodic intervals such as 15 minutes or 30 minutes. In addition, if desired, a sensor switch S coupled to the transmitter microphone P may be utilized to produce a signal applied to timer circuit 16 to initiate transmission of the station's call letters upon termination of information transmission by the user or after a period of activity or use. Further, a separate test or manual start signal may be applied to time circuit 16 to initiate transmission of a station's call letters as described above.

DESCRIPTION OF DETAIL SCHEMATIC DRAWING (FIGS. 2, 3, and 4)

With reference to FIG. 2, alternating current power is supplied through to leads 20–1 and 20–2 to on-off switch 21 and fuse 22 to the primary 23–P of transformer 23. A stepped down voltage on the secondary 23–S of transformer 23 is rectified by a bridge rectifier 24, filtered by filter capacitor 26 and applied through a voltage regulator 27 to a low voltage direct current power terminal 28. Resistor 27–R and Zener diode 27–Z control the base potential on series regulator transistor 27–P in a known manner. Resistor 29 and capacitor 30 serve as a further filter. Alternating current power is also supplied to a tape drive motor 31 which is continuously driven since it is connected directly across the alternating current lines 20–1 and 20–2. Similarly, a clutch solenoid 32 is connected across the alternating current input through a switch or contact element 125–6 of clutch control delay 125 (to be described later).

AUDIO AND CONTROL SIGNAL AMPLIFIERS (FIG. 3)

Coil element 60 of transducer 17, is aligned with the track of the tape carrying voice recordings of the station call letters and movement of the tape induces voltages in coil element 60 which are applied to the first stage of an audio amplifier 15, such amplifier is conventional and is not described in detail here. Potentiometer 61 is an audio level control preceding the final stage of the amplifier. A feedback network comprising resistor 62 and capacitor 63 equalize the amplifier for a given tape speed (3.75 inches per second) with a frequency response of 200 to 5000 cycles per second. The audio output at the collector of the final stage 64 of amplifier 15 is passed by a large coupling capacitor 66 to audio output terminal 67 through contacts 125–3 of relay 125 (FIG. 2) when relay 125 has been energized.

Coil element 68 of transducer 17, is aligned with the track of the tape carrying a fixed frequency control signal of about 1000 cycles per second and movement of the tape induces voltages in coil element 67 which are applied to the first stage of amplifier 18. Amplifier 18 is conventional in design with direct current feedback to stabilize the bias level. The output stage 69*a* preceding stage 69 is biased to produce essentially square waves at the 1000 c.p.s. rate. With respect to the final stage 69 of amplifier 18, the operating coil of control relay 125 is connected in series with the collector electrode of transistor 71 and a clamp diode 70 is connected in parallel with the coil of relay 125 to prevent complete current reversal in the relay coil. Capacitor 72, with transistor 71 affords partial integration of the output signal, and holds relay 125 on and eliminates chatter. Amplifiers 15 and 18 may be of conventional components or micrologic units (such as integrated circuit component #IC CA 3020 by Radio Corporation of America) however, the final two stages of amplifier 18 should have sufficient gain to operate relay 125 as described above.

TIME OR ONE SHOT CIRCUIT (FIG. 4)

The 1000 c.p.s. control signal or cue tone, recorded on a separate track of the tape is preferably broken between each message to stop the tape transport unit, otherwise all of the messages would be transmitted on a continuous basis. Hence, the distance of space X (FIG. 5) between recorded control signals on the tape is accurately set during preparation of the tape by an electronic timing unit (not shown). This space, in conjunction with the timing (one second) of time circuit 16, will bridge the gap in the tape and move the next section of control signal into the pick-up unit 17 (coil element 68) to hold the tape clutch 13 engaged.

Input trigger signals (e.g. ground) on line 80 generate spike trigger pulses by discharge of capacitor 81–C, which, during quiescent periods, is charged from the direct current supply through resistor 81–R. These spike trigger pulses (one for each grounding on line 80) are passed by diode 82 to base 83 of transistor 84, which is normally conducting. Emitter 86 is directly connected to the emitter 87 of normally nonconducting transistor 88 and to ground through low resistance resistor 91 which is bypassed by a small capacitor 92. Emitter bias potential for transistors 84 and 88 is obtained through resistors 93 and 94 to the direct current supply and bias potential for the base of transistor 84 is obtained at the intermediate point on voltage divider resistors 96 and 97 which are connected across the direct current supply. Collector 85 of transistor 84 is connected to the direct current supply through collector resistor 98 and collector 89 of transistor 88 is connected to the direct current supply through its collector resistor 99. The output on collector 85 of transistor 84 is coupled to the base 90 of transistor 88 at the intermediate point between resistors 100 and 101 and resistor 100 has connected in parallel therewith capacitor 102. Clamp diode 103 is connected between base electrode 90 and emitter electrode 87 of transistor 88. A large feedback and timing capacitor 104 connects the output on collector 89 of transistor 88 to the input base electrode 83 of transistor 84. As thus described, it will be recognized that transistors 84 and 88 form a one shot trigger circuit. Component values are selected so that the circuit has a duration of about one second in the switched or unstable state.

The output of this circuit is taken from the collector 85 of transistor 84, through a Zener diode 106 to voltage divider resistors 107 and 108, the intermediate point of such resistors being connected to base 109 of transistor switch 110, which is normally off. Emitter 111 of this transistor is grounded while the collector 112 is connected through operating coil 113 of relay 113 to the direct current supply. Diode 114 is connected in shunt with relay coil 113 to prevent complete current reversal. Zener diode 106 does not conduct until the voltage at collector 85 of transistor 84 rises above its Zener voltage.

PROGRAMMER (FIG. 2)

Program selection switch 100 is a five pole, three position switch in which position 1 is a test or manual position, position 2 is for initiating a 15 minute identification interval and switch position 3 is for initiating a 30 minute identification interval.

With respect to switch element 100A, pole position 1 is open whereas pole positions 2 and 3 are connected together and directly to one side of the alternating current input line. The wiper of switch 100A is connected directly to cam actuated switches 101–1 and 101–2 as well as being directly connected to the stationary contact of switch position 3 of switch element 100B by conductor 9. Position 2 of switch element 100B is connected directly to one side of normally closed cam actuated switch element 101–1. The wiper of switch element 100B is connected directly to normally closed cam actuated switch 102–1 and normally open cam actuated switch 102–2.

Switch position 2 of switch element 100C is connected directly to normally open cam actuated switch 101–3. The wiper of switch element 100C is connected directly to the low voltage supply terminal 28 of which is also connected to normally open cam actuated switch element 102–3.

Switch positions 2 and 3 of switch element 100D are connected directly together and to normally open switch element 115–3 on relay 115. The wiper switch 100D is connected directly to the operating coil of time relay 114.

Switch position 1 of switch element 100E is connected directly to terminal 1 of terminal strip or block 35 which will be described more fully hereinafter. Switch positions 2 and 3 of switch element 100E are connected directly together and through a conductor to terminal 5 of terminal block 35 which is the microphone grounding terminal for automatic transmission as described more fully hereinafter.

As shown in detail in FIG. 6, switch elements 101–1, 101–2 and 101–3 are cam actuated switches, each being actuated once every 30 minutes, with switch elements 101–2 and 101–3 being actuated by their associated cams 101–C2 and 101–C3, respectively, one minute before switch element 101–1 is actuated by its cam 101–C1 and remaining actuated for a one minute interval longer than switch element 101–1. For this reason, cam notches 101–N2 and 101–N3 are slightly longer than cam notches 101–N1. Similarly, cam actuated switch elements 102–1, 102–2 and 102–3 are actuated once every 30 minutes by cams 102–C1, 102–C2 and 102–C3, respectively, with switch elements 102–2 and 102–3 being actuated by cams 102–C2 and 102–C3, respectively, one minute before switch element 102–1 is actuated by its cam 102–C1, and remains actuated for one minute longer than switch element 102–1. For this reason, cam notches 102–N2 and 102–N3 are slightly longer than cam notch 102–N1. However, since the cam notches actuating switch elements 101 are displaced 180° from cam actuating switch elements 102, there will be a pulse generated every 15 minutes (the cam shafts being geared for rotation by synchronous motor 99 at a rate of two revolutions per hour). In other words, in the arrangement shown in FIG. 6, when selector switch 100 is in position 2, each cam actuated switch is actuated twice for each revolution of the cam shafts and, the cams being displaced 180° from each other, results in producing four energizing pulses to relay 114, one at each 15 minute interval. Selector switch 100 is utilized for rendering selected ones of the cam actuated switch elements effective. Thus, switch 100 renders all cam actuated switch elements ineffective when in position 1, all cam actuated elements effective when in position 2 (the 15 minute interval) and, cam actuated switch 101–3 being rendered ineffective in switch position 3 (30 minute interval), and cam actuated switches 101–1 and 101–2 being bypassed by conductor 9.

As noted earlier, transmission of station call letters is initiated in all instances on operation of time relay 113 by time circuit 16 and in all cases this is effected by the closure of contact 114–1 of relay 114.

One shot or time relay 113 has normally open contact 113–1 which initiates closure of tone or control relay 125. Normally opened switch element 113–2 connects the direct current voltage at supply terminal 28 to relay 115 to energize this relay while the one shot time circuit 16 is on. Relay 115 has a latch circuit through its contact 115–3 which holds this relay in during operation of the time circuit 16. Normally closed contact 115–1 of relay 115, open on actuation to prevent premature reactuation of the one shot time circuit 16. Switch 115–4 of relay 115 is for the purpose of energizing programmer motor 99 so as to lift it out of dwell and return cam switches 101–1 and 102–1 to their normally closed positions (during the automatic signal seeking mode described later herein).

Contacts 113–3 of relay 113 are in circuit with the coil of relay 121 in a signal seeking logic circuit and when contacts 113–3 are opened, ground is removed from relay 121 so that it will reset itself.

Contacts controlled by control relay 125 include normally open contacts 125–5 which is used to simulate ground and to maintain the transmitter "on" condition of the ground normally furnished by the operated microphone key. Normally open relay contact 125–4 connect an "on air" indicator lamp 129 across the 12 volt supply to signal that the station's call letters are being transmitted. Two position switch elements 125–3 are utilized to switch the audio output from the microphone to the station call letters on lead 67 from the audio pick-up channel amplifier 15 (FIG. 3).

Normally open switch element 125–2 is utilized to control a remote indicator (not shown) which may be connected to terminal 11 of terminal board 35. Normally closed contact element 125–1 controls a microphone voice lock-out via leads 126 and 127 while the circuit is in operation and transmitting the station's call letters.

SEQUENCE OF OPERATIONS (1) The programmer is set at 15 minute intervals as a selected identification cycle. Since the programmer motor 99 is geared to rotate the cam shaft at 2 revolutions per hour, with cams 101–1, 101–2 and 101–3 located at 0° and cams 102–1, 102–2 and 102–3 at 180°, both sets of dwells are used for 15 minute operation and only one set (cams 102–1, 102–2 and 102–3) for 30 minute operation.

(2) When the switch 21 is closed, programmer motor 99 will run until cam switch 101–1 falls into the minimum pulse width dwell, cam notch 101–N1, while cam followers for switches 101–2 and 101–3 drop in cam notches 101–N2 and 101–N3, one minute ahead of cam 101–C1 and stay in dwell one minute longer than cam switch 101–1.

When cams 101–C1, 101–C2 and 101–C3 are in dwell position, and the unit is arranged for auto transmission, the following will take place without any waiting:

(a) A ground signal is present through switch 100E, from terminal block 35, pin 5, switch element 115–1 of relay 115 to the normally open contact 114–1 of relay 114.

(b) Due to the operation of the programmer, switch 101–3 has been actuated and through switch 100C (in the 15 minute position) −12 volts is presented to the coil of relay 114 which causes this relay to operate and supply a ground to activate the one shot circuit 16 (FIG. 4).

(c) Once activated the lower side of the coil of relay 113 goes to ground through switching transistor 110 and is held in for the one second duration of time circuit 16.

(d) Operation of relay 113 causes control relay 125 to be operated through switch element 113–1 of relay 113 (and subsequently held in by tape movement and the 1000 c.p.s. control signal). It also (via contacts 113–2 of relay 113) provides −12 volts to the coil of relay 115 which is activated.

(e) Relay 115 is actviated through contacts 113–2 for one second and latched through switch element 115–3 via 100D and cam switch 101–3 which is still in the switched condition (N.O.) and allows 12 volts to be applied to the coil of relay 115. This causes contacts 115–4 to operate and apply 110 volts to motor 99 to restart the programmer again and will cause it to continue to run until minimum pulse cam contacts 101–1 is out of the dwell (and 102–C1 also as it is 180° out of phase with cam 101–C1) and take over control of programmer motor 99 again. One minute later cam switch 101–3 will be returned to its relaxed or normally closed condition and remove 12 volts from switch 115–3 thereby allowing it to deenergize and return all contacts to positions shown in FIG. 2. During this period, normally closed contacts 115–1 have been open thereby eliminating any possibility that another ground signal could be applied to the one shot timing circuit 16 to cause a premature operation of the unit. When contacts 115–4 of relay 115 are reopened, control of the programmer is returned to cams 101–1, 101–2, 102–1 and 102–2.

Relay 121 is used in conjunction with automatic signal seeking function of the unit. A −12 volts input is required on terminal strip 35, pin 8, when the transmitter is not in use. This 12 volts is used to set up the logic of the signal seeking system. This is done since identification is required only if there has been activity during the preceding period and, if there has not been any activity, the unit will wait and identify immediately after the next transmission. Therefore the circiutry works as follows:

(1) A set of contacts 150, SPDT are required on the carrier operated relay unit 151 with the wiper 152 connected to terminal block 35, pin 8 and −12 volts from pin 10 of terminal block 35 to the side of the switch that makes contact when the transmitter is in the transmitting condiiton and a ground connection from pin 7 of terminal block 35 to the contact indicating the transmitter is not in use. Furthermore, a jumper 153 (shown dotted) is connected between pins 4 and 5 of terminal block 35.

(2) If the transmitter has been used then the following events will have occurred:

(a) The carrier operated relay 151 will have switched from ground to −12 volts and an input signal of −12 volts would have appeared at pin 8 of terminal strip 35 and applied through normally closed contacts 121–4, diode 116 and 121–3 of relay 121 to the coil of relay 121 and activated the relay causing the contacts thereof to switch position. The 100 mf. capacitor 120 and 5.1K resistor 119, supplied through diode 118, hold the relay in while the transfer is being made until normally open contacts 121–2 effect a latching circuit to hold the coil of relay 121 in an energized condition.

(b) At this time the microphone key will be released (e.g. termination of a transmission) and carrier operated relay 151 will operate causing a ground to appear on pin 8 of terminal strip 35, which through diode 117 (which is poled in a direction opposite the poling of diodes 116 and 118) and contacts 121–1 of relay 121 is routed to pin 4 of terminal strip 35, jumpered to pin 5 and switch element 100E, thence to contacts 115–1 and contacts 114–1 of time relay 114. This ground will remain until programmer cam switches 101–3 or 102–3 (depending on whether a 15 or 30 minute interval is selected) operate and energize the coil of relay 114 and trigger the one shot circuit 16.

(c) At this time relay 113 will operate and contacts 113–3 of relay 113 are removed from ground and relay 121 is deenergized and returned to normal condition awaiting the next series of logic triggers for the auto signal seeking connection.

Normally there is little or no modification of existing base station equipment to incorporate the present invention. To set the unit into operation connect terminal strip 35, input jack 122 and output jack 123 as follows:

Disconnect the station's microphone plug from the existing position on the station's amplifier chassis and connect to jack 122 and connect a new cable (not shown) between output jack 123 and amplifier input jack where the microphone cable was previously removed. This basically is an in-out hook-up except for the circuitry between jack 122, pin 2 and jack 123, pin 2, which is broken at contacts 125–1 via leads 126 and 127 during the period of time the station identifier is in operation (relay 125 is energized during this period by virtue of the control or tone circuitry causing transistor 71 to switch the collector thereof to ground). Contacts 125–3 of relay 125 cause an insertion of the prerecorded tape message into pin 2 of Jack 123 and thus out to the transmitter amplifier while disconnecting any microphone voice input during this period. This audio output may be monitored at jack 140. Pin 12 of terminal strip 35 is used as an output of the station identifier also, if a parallel voice message is acceptable between the identifier and the communicator, if the mode of operation previously described is not desired. Pin 11 of terminal strip 35 used for a remote indicator lamp (not shown) and is grounded through contacts 125–2 of relay 125 while the identifier is in operation during a transmitting cycle, pin 10 of terminal strip 35 offers the 12 volts to the carrier operated relay contacts (a transmitter relay) for use in the auto signal seeking mode.

As noted earlier, pin 8 of terminal strip 35 is the input used when an automatic signal seeking sequence is required. This method of operation will cause the station identifier to program itself and wait until the transmitter is not in use before inserting the prerecorded call letters. This is accomplished by an external set of contacts on the transmitter equipment which are located on a carrier operated relay or transmitter relay 151 which offers a set of contacts (SPDT) which may be used for this purpose. If the station transmitter does not have available a set of contacts they may be added for this purpose.

Pin 6 of terminal strip 35 used as a ground input from a remote switch if the unit is to be triggered manually. It can also be used to trigger the unit in "test" condition through switch 100E, position 1, simply by grounding pin 5 of terminal strip 35 can be grounded for a mode of operation that will have the automatic station identifier program and identify without waiting. Pin 4 of terminal strip 35 may be jumpered (jumper 153) to pin 5 (ground removed from pin 5) for the automatic signal seeking mode of operation described earlier. In this way the necessary ground is presented to pin 5 of the terminal strip through pin 4 via contacts 121–1 of signal seeking relay 121. Pins 1, 2 and 3 of terminal strip 35 are available for jumper in accordance with variations in commercially available equipment to provide the necessary ground for the transmitter key and, in effect, serve to rewire jacks 122 and 123 to accommodate such variations. It will be apparent that other variations than those suggested below may be effected without departing from the invention. Thus, pin 2 of terminal strip 35 may be jumpered to pin 1 for use on certain Motorola transmitters as these contacts afford a ground signal to the transmitter to simulate the ground normally initiated by the microphone switch when it is depressed for operation. This ground is achieved through contacts 125–5 on relay 125. Alternatively on certain General Electric transmitters, pin 3 of terminal block 35 may be jumpered to pin 2 to provide transmitter ground simulation.

In summary, the coil of relay 113 is energized by time circuit 16 at any time a ground is applied to lead 80, the coil of relay 125 is energized initially by contacts 113–1 of relay 113 and held for one second. During this time contacts 125–6 of relay 125 cause clutch solenoid 32 on motor 99 to start capstan 11 to move and move the 1000 c.p.s. tone on the tape into position on pick-up head or transducers 17. This tone, through amplifier 18, causes transistor 71 to switch and grounds one side of the coil for relay 125 latching it on for the period of time that the 1000 cycle tone is present and moving across the pick-up head 17. When it is interrupted at the end of the transmission the ground disappears and relay 125 releases. As previously discussed contacts 125–1 of relay 125 act to disconnect any microphone inputs during the identifying period; contacts 125–2 provide a ground for a remote indicator; contacts 125–3 control the audio output; contacts 125–4 provide a ground for indicator lamp 129 and contacts 125–5 (via lead 130) simulate microphone switch ground to maintain the transmitter in an ON condition during the identifying cycle.

One shot relay coil 113 is activated by the one shot circuit 16 through switching transistor 110. Relay 113 remains energized for approximately one second during which time it applies a ground to the coil of control relay 125 causing its initial closure and the previously discussed results. Contacts 113–2 make contact and −12 volts is routed to the coil of relay 115 causing it to operate. Contacts 113–3 of relay 113 are opened and ground is removed from relay 121.

The coil of relay 115, having been operated by the operation of contacts 113–2 of relay 113, is held energized for the one second interval of time circuit 16 by the 12 volts delivered through contacts 113–2 of relay 113 and is then latched in place by another 12 volts introduced through contacts 115–3 of relay 115 by way of switch 100D when positioned in either the 15 (position 2) or 30 (position 3) minute position and through the wiper to the activated side of either cam switch 101–3 or 102–3 of programmer motor 99. This will latch only if the programmer cycle has been completed and the cams have dropped into the dwell.

As noted earlier, renditions of the station's call letters are recorded on a continuous loop type in a replaceable cartridge and while the tape drive motor is running continuously, the tape is moved intermittently, once for each rendition, through clutching of the tape drive capstan which affords a minimum of air time to transmit a station's call letters and long tape life.

An important aspect of the invention is it adaptability to any identification program desired by the operator, which comply with regulations of the Federal Communications Commission. For example, an infrequent user or station operator operating under certain rules of the Commission (Part 91 of Volume 5 of FCC Rules) need only identify himself after every transmission or every 15 minutes. By utilizing the automatic signal seeking features described above, there will be an identification, e.g., transmission of the station's call letters at approximately 15 minute intervals (selected by switch 100) if the transmitter has been in operation during the previous time interval or period. If there has been no transmitter activity, the interval programmer motor will stop until the next transmission is made (which will normally be a call or acknowledgment) at which time the station's call letters will be transmitted immediately following the transmission and automatically begin the timing cycle again. This mode of operation assures that normal transmitter operation will not be interrupted but that an identifying sequence will follow immediately any transmission that may be in process when the programmed interval has been completed. Moreover, a user equipped with a handset, hook switch or like units may be adapted to this mode by using the disconnect signal as a trigger to activate the identification cycle.

Instead of transmitting station call letters following a period of activity, the call letters may be transmitted periodically at selected 15 or 30 minute intervals, for example, by a user or operator operating under other FCC Rules (e.g., sections 89 or 93) who desires identification to pre-empt station activity on the user who is required to identify at periodic intervals. In this mode the unit runs continuously and the programmer will act substantially as a built in clock and transmit call letters at selected preset time intervals.

What is claimed is:

1. Apparatus for automatic transmission of station call letters of a radio station comprising a record medium having recorded thereon station call letters assigned to the station and a control signal of a fixed frequency recorded over a selected portion of said tape on which said station call letters are recorded, a continuously operating record medium drive motor, a record medium drive means, clutch means between said record medium drive means and said drive motor for connecting said record medium drive means to said drive motor so as to cause the record medium drive means to be driven by said record medium drive motor, control circuit means for said clutch means comprising in combination, a record medium movement start circuit means connected to said clutch means for momentarily actuating said clutch means to initiate movement of said record medium, means for sensing the control signal recorded on said record medium and producing a clutch hold voltage for maintaining said clutch actuated after initiation of movement of said record medium by said record medium movement start circuit for the extent of said portion of said record medium on which said station call letters are recorded, transducer means for sensing said station call letters recorded on said medium and producing electrical signals corresponding thereto, and means for applying electrical signals produced by said transducer means to station transmitter for transmission thereby.

2. The invention defined in claim 1 wherein said record medium movement initiating circuit means includes programmer means for periodically producing pulses at a selected pulse rate, and a time circuit operated once on occurrence of each periodically produced pulse for producing record medium movement initiating pulses having a time duration sufficient to initiate movement of said record medium.

3. The invention defined in claim 2 wherein said programmer means includes rotatable cam means, switch circuit means actuated by said cam means, and a constant speed cam drive motor drivingly coupled to said cams.

4. The invention defined in claim 3 wherein said cam means includes a plurality of cam elements symmetrically disposed about the axis of rotation thereof, and said switch circuit includes a switch element associated with each cam element.

5. The invention defined in claim 4 wherein one cam element at each symmetrical position includes at least two switch camming surfaces, one of said switch camming surfaces being less in length than the remainder of said camming surfaces, whereby the remaining said camming surfaces control their associated switch elements for a period of time before, during and after the control by said one of said camming surfaces.

6. The invention defined in claim 5 including selector switch means for bypassing selected of said switch elements whereby said switch circuit means is effective at only selected symmetrical positions of said cam surfaces.

7. The invention defined in claim 3 including means connecting said cam drive motor in circuit with said switch circuit means to control power supplied to said cam drive motor to terminate drive of said cam means and production of pulses for operating said time circuit.

8. The invention defined in claim 7 including means sensing the condition of said transmitter and producing a signal at the end of a period of transmitter activity, and means controlled by a signal so produced for supplying power to said cam drive motor and actuating said time circuit.

9. The invention defined in claim 6 wherein said cam elements are rotated by said cam drive motor at a speed of about two revolutions per hour, there being two symmetrical positions of said camming surfaces whereby said selector switch means selects a time interval of 15 or 30 minutes

10. The invention defined in claim 1 wherein said record medium is a multitrack magnetic tape, having recorded on at least one track said station call letters and on at least another of said tracks said control signal of a fixed frequency.

11. The invention defined in claim 10 wherein said tape initiating circuit means includes a pulse operated time circuit for producing clutch actuating pulses, means connected to said time circuit for producing pulses for operation of said time circuit, said transmitter including a microphone having a transmitter control switch, means connected to said pulse operated time circuit and operated by said transmitter control switch following operation thereof for producing and applying a pulse to said pulse operated time circuit.

12. The invention defined in claim 1 wherein said time circuit comprises a one shot multivibrator circuit having a time duration of about one second.

13. The invention defined in claim 1 wherein said portion of said record medium on which said fixed frequency control signal is recorded is longer than the portion of said record medium on which said station call letters are recorded so that said fixed frequency control signal is continuously produced: from slightly before any station call letters are transduced by said transducer means, through the time when said recorded station call letters are being transduced by said transducer means to slightly after termination of said recorded station call letters on said tape.

14. The invention defined in claim 13 including switch means connected to said sensing means and operated by said control voltage for applying the output of said transducer means to said transmitter.

15. Apparatus as defined in claim 1 wherein said control circuit includes
means to detect termination of an operator initialed transmission by the radio station, and
means controlled by said means to detect termination of an operator initialed transmission to supply a record movement initialing signal to said record movement initialing circuit.

16. Apparatus as defined in claim 2 wherein said programmer means includes
a programmer motor,
rotatable cam means rotated by said motor,
and a switch circuit operated by said cam means for initiating said periodic pulses.

17. Apparatus as defined in claim 16,
said rotatable cam means including a plurality of cams, and said switch circuit including a switch element operated by each cam, and
a selector switch means for rendering selected ones of said switch elements operable.

18. Apparatus as defined in claim 17 wherein each cam operates its associated said switch element once for each rotation thereof by said programmer motor,
said selector switch means having at least one position wherein all of said switch elements are rendered effective, at least one position wherein all of said switch elements are rendered ineffective, and at least one position wherein some but not all of said switch elements are rendered effective.

19. Apparatus as defined in claim 1,
said apparatus including means sensing an operator initiated transmission, and means controlled by said sensing means to delay a periodic initiation of said tape drive until the end of an operator initiated transmission.

References Cited

UNITED STATES PATENTS

| | | | |
|---|---|---|---|
| 2,134,562 | 10/1938 | Kimmich | 325—166 |
| 2,305,496 | 12/1942 | Roberts | 325—183 |
| 2,375,672 | 5/1945 | Malone | 325—166 |

ROBERT L. GRIFFIN, Primary Examiner

ALBERT J. MAYER, Assistant Examiner

U.S. Cl. X.R.

325—183